United States Patent
Kang et al.

(10) Patent No.: US 6,741,994 B1
(45) Date of Patent: May 25, 2004

(54) METHOD AND AUTOMATIC ORGANIZATION OF DATA

(75) Inventors: Beng Hong Alex Kang, Singapore (SG); Jin Fye Leong, Charlottesville, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/122,981

(22) Filed: Jul. 27, 1998

(51) Int. Cl.⁷ .............................................. G06F 17/30
(52) U.S. Cl. ...................... 707/102; 707/100; 707/101; 707/200; 707/10
(58) Field of Search ...................... 707/1–10, 100–104, 707/200–206, 104.1; 709/201, 107, 101, 106, 102; 705/39

(56) References Cited

U.S. PATENT DOCUMENTS

| | | | | |
|---|---|---|---|---|
| 5,369,778 A | * | 11/1994 | San Soucie et al. | 707/103 |
| 5,421,012 A | * | 5/1995 | Khoyi et al. | 709/107 |
| 5,421,015 A | * | 5/1995 | Khoyi et al. | 709/107 |
| 5,428,782 A | * | 6/1995 | White | 709/101 |
| 5,561,793 A | * | 10/1996 | Bennett et al. | 707/201 |
| 5,634,124 A | * | 5/1997 | Khoyi et al. | 707/103 |
| 5,694,601 A | * | 12/1997 | White | 709/101 |
| 5,754,845 A | * | 5/1998 | White | 707/10 |
| 5,809,497 A | * | 9/1998 | Freund et al. | 707/2 |
| 5,819,089 A | * | 10/1998 | White | 709/106 |
| 5,862,325 A | * | 1/1999 | Reed et al. | 709/201 |
| 5,896,530 A | * | 4/1999 | White | 709/102 |
| 6,016,484 A | * | 1/2000 | Williams et al. | 705/39 |

FOREIGN PATENT DOCUMENTS

| | | | | |
|---|---|---|---|---|
| WO | WO98/09237 | 3/1998 | ............ | G06F/17/30 |
| WO | WO98/37474 | 8/1998 | | |
| WO | WO99/31604 | 6/1999 | ............ | G06F/17/30 |
| WO | WO 01/20438 | * | 3/2001 | ............. G06F/3/00 |

OTHER PUBLICATIONS

Goldstein, Robert C. and Wagner, Christian; "Database Management With Sequence Trees and Tokens"; IEEE, vol. 9, Issue 1, Jan./Feb. 1997; pp. 186–192.*

* cited by examiner

*Primary Examiner*—Vincent Millin
*Assistant Examiner*—Ella Colbert

(57) ABSTRACT

A data organization application allowing the automatic organization of input data into fields of a record of a database is provided. The database is maintained by a separate application. To organize data, a user inputs data in a free form manner onto an input screen provided by the application. When the data entry is completed, the user invokes an organize function in the application to process the input data. The application breaks the input data into logical groups that belong together and assigns tokens to these logical groups. From the assigned tokens, the application is able to identify single tokens or groups of tokens that belong to a unique field or a number of unique fields in the record of the data store. The application goes on to identify other logical groups of data in the input data which belong to other fields in the record. The application next displays the logical groups of data in their respective fields in a confirmation screen and requests the user for a confirmation to allow it to proceed with a storage transaction where the application stores the logical groups of data as displayed on the screen to the database. The user is allowed to make modifications to the data displayed on the confirmation screen before confirming the storage transaction. Upon confirmation, the application stores the data as displayed on the screen to the fields in the record of the database. The user is able to access the stored record using the separate application.

3 Claims, 4 Drawing Sheets

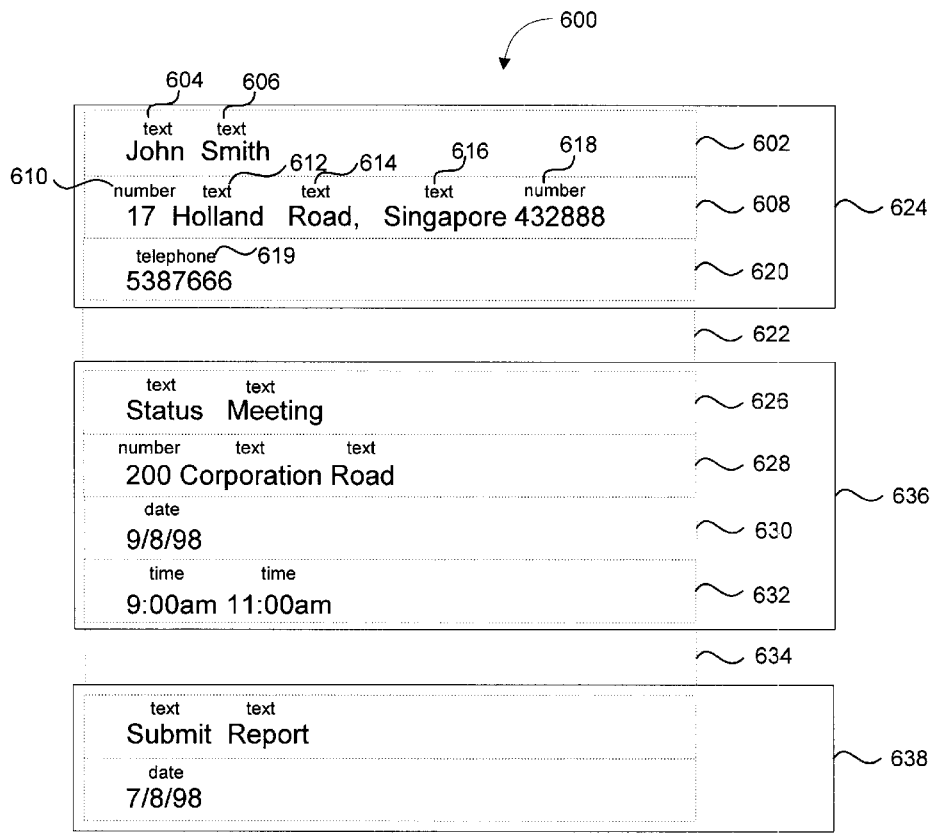

FIGURE 6

| Record Type | Field Type | Token Composition Rules | |
|---|---|---|---|
| Contact | Name | line consisting of one or more TEXT tokens | 702 |
| | Address | line consisting of one or more NUMBER and one or more TEXT tokens | 708 |
| | Home Tel | TELEPHONE token | |
| | Email | EMAIL token | |
| Appointment | Description | line consisting of one or more TEXT tokens | 704 |
| | Venue | line consisting of one or more NUMBER and one or more TEXT tokens | 710 |
| | Date | DATE token | |
| | Start Time | TIME token | |
| | End Time | TIME token following start time TIME token | |
| Task | Description | line consisting of one or more TEXT tokens | 706 |
| | Due Date | DATE token | |

METHOD AND AUTOMATIC ORGANIZATION OF DATA

FIELD OF THE INVENTION

This invention relates to automatic organization of data and more particularly to automatic organization of personal information data in an electronic organizer. An organize application program in the electronic organizer automatically classifies and stores a set of input information into one or more appropriate databases.

BACKGROUND

With an avalanche of information in the modern and busy world, electronic organizers such as personal digital assistants (PDA's) and handheld personal computers (PC) have replaced pen-and-ink diaries for the recording of personal management information. Examples of personal management information are information of business contacts and appointments. In the pen-and-ink diaries, separate sections are available for recording the different types of information. An address and telephone directory section is usually provided for recording information such as name, address, telephone number and other information of business contacts and friends. A separate section is also devoted to the recording of appointments where pages representing each calendar day of the year in which appointments can be recorded are provided. Sometimes, a separate task section is devoted to the maintenance of a to-do list.

There are two aspects in the usage of an organizer: the entry and the retrieval of information. A typical user follows one of two methods to enter information into the pen-and-ink diary. The user can either quickly jot down the information in free form manner on a rough piece of paper and organize them into the appropriate sections of the diary later. Or alternatively, the user can interrupt the meeting so as to allow the user to record the information in the diary. Though this pen-and-ink diary serves its purpose, it suffers from disadvantages. As an example, consider the following scenario. A user of a diary is in the middle of a business meeting, and is required to record the following chunk of information given which the user is expected to hurriedly record without impeding the progress of the meeting:

The next status meeting is scheduled for 9 August, at 9–11 a.m., in the Einstein Room. But before the next meeting, the user has to submit a status report to the Operations Manager two days before the meeting, that is, by 7 August. And for input to the report, the user needs to contact Mr. John Smith of the Sales and Marketing Department to get the sales forecast for the next quarter. John's phone number is 538-7666, and his email address is john-smith@singnet.com.sg.

To use the diary effectively to record the information on the fly, a user has to quickly assimilate the information to decide what information goes into which sections of the diary. Using the same example as above, a user would first need to break the chunk of information into logical pieces according to the applications which are used to store them. The information when broken down according to the respective applications is as follows:

1. Status Meeting to be held on 9 August, at 9–11 a.m., in the Einstein Room (to be entered into the Calendar application).
2. Submit Status Report to the Operations Manager by 7 August. Contact John Smith of Sales and Marketing Department for sales forecast for the next quarter (to be entered into the Task application).
3. John's phone number is 538-7666, and his email address is john-smith@singnet.com.sg (to be entered into the Contact application).

It is obvious that this separation of information is not intuitive to a user who has to quickly record the information. The user would usually prefer to simply capture the information first and organize them later. This capture-first-organize-later approach comes across as more intuitive to the user. In the real world, information is usually received from unscheduled and spontaneous sources, requiring the user to adopt this capture-first-organize-later approach to record the information. Sources of such information include information received from conversations with people or from the mass media. The conversations may be carried out over the phone, in person, through electronic mails or by other means. Mass media information includes information disseminated through television and radio broadcasting, newspapers, magazines etc. When receiving information in such situations, the user has to quickly capture the information so as not to miss any detail. The user will usually grab any rough piece of paper like sticky note pads, newspapers and grocery bills which are within easy reach of the user to capture the information. The user will decide if the information is worth more permanent storage later. These pieces of information can be classified as either short-term or long-term information. Short-term information is information which is of temporary use like the telephone and address of a store. Long-term information, on the other hand, is information which may be of longer interest to the user, like contact information of friends and family members. The user will usually transfer longer-term information into a more permanent storage such as in the pen-and-ink diary.

Another disadvantage of the pen-and-ink diary is the tedious process of searching for information that was previously recorded. For example a user records an appointment which is five months away in the diary. After a time lapse, the user equipped with only information regarding what the meeting is about will find great difficulty in recalling which day and therefore on which page the appointment information is recorded. A further disadvantage which is also linked to searching is the unavoidable haphazard way a user enters information. For example, information in the address and telephone directory is not ordered in any manner, and a user wishing to search for a particular item will have to scan through the entire directory to locate the required piece of information.

Electronic organizers allow much faster searches. Some even allow invoked searches on one application to search for information residing with other applications. An example of such a search feature is found in the find tool of applications for Windows CE (Windows CE, a trademarked operating system from Microsoft, Redmond, Wash., USA). One of the reasons that contribute to a faster search is the more orderly manner of information storage as compared to that possible in a pen-and-ink diary. The separate groups of information are not only maintained in different databases, very much like the different sections in a pen-and-ink diary but they are also sorted before being stored. The processing power of the microprocessor in such electronic organizers further enhances the speed with which searches of information can be made. To search for a particular piece of information, a user simply invokes a find feature which scans a user-specified number of databases for the particular piece of information. Even though the electronic organizers are more useful and convenient as compared to the pen-and-ink diaries, they still suffer the same disadvantage of slow data entry. This problem is further exacerbated by the fact that the keyboard of the electronic organizers is usually small and therefore limits the speed with which a user can use the keyboard to enter information. The different types of information are also stored in separate databases necessitating the user to launch different applications to record the different types of information. In such cases, there is a one-to-one relationship between an application and a database. The speed of information entry is governed by how fast a user can decide which application to launch to capture a particular set of information. Also, once the appropriate application is launched, it is not possible for a user to enter information using a free form manner since the graphical user interface (GUI) of the application will dictate the manner a user enters data, thus further slowing down the process of information entry.

The process involved in information entry inconveniences a user who now has to assimilate the information to be organized, decide the application under which the information should rightfully reside with, launch the selected application and enter the information as dictated by fields in the GUI input screen. Users of these electronic devices are mostly mobile people who would rather do away with this extraneous step of having to decide which of the many applications to launch to capture a set of information. Also, a user would prefer to enter information in an order as and when the information is supplied and not have to look for a field to enter a certain piece of information. This restrictive manner in which an application requires a user to enter information is unintuitive and impedes the process.

The naming of the applications on organizers of different make further inconveniences a user. For example, a contact application in one organizer is known as a phone application in another organizer. Similarly, a calendar application in one organizer is known as an appointment application on another. The task of having to decide which application to launch for a user who owns two such organizers is inconvenient and annoying. The user would rather remember just one application and be able to enter information using the one application as would be the case with a rough piece of paper where the user could enter the information in a sequence as the information is supplied.

The foregoing therefore creates the need for an application software or a software function within an application software which a user can independently launch or invoke to quickly capture any input information entered in a free form manner. Once the information is entered, the user can either have the information organized immediately or wait till a more convenient time later to organize the information. To organize the information, the user simply activates the automatic organize function which takes the input information, classifies the information into groups and stores the individual groups of information into the appropriate databases.

SUMMARY

An organize application software on an electronic organizer is provided with a preferred method for hassle free capturing and organizing of information. To capture and organize a set of input information, a user simply launches the organize application which, according to one aspect of the invention, is separate from and independent of existing applications on the electronic organizer. A graphical user interface (GUI) is presented to the user to allow the user to enter the input information in a free form manner. Once the user is done with the information entry, the user can either organize the information immediately or at a later time convenient to the user. To organize the information, the user invokes an organize function to process the input information. This invocation causes the application to parse the input information and decide what the input information is and where and how the information is to be stored.

With this invention, a user no longer needs to worry about which of the many applications to invoke to organize a set of input information. The user needs to launch only the organize application. The user is also allowed to enter information in a free form manner. In other words, data entry is not dictated by fields in a database; once the free form information is entered, the application decides how the information is to be organized. The invention also corresponds closely to a capture-first-organize-later approach which is more intuitive to the user. All these simplified steps allow a user to more quickly capture short and long-term information and storing only longer-term information which the user deems necessary.

BRIEF DESCRIPTION OF DRAWINGS

The invention will be better understood with reference to the drawings, in which:

FIG. 6 is an example of how an example set of input information is tokenized and classified as field and record types by the organized application of FIG. 2.

FIG. 7 is a set of rules used by the application to determine field and record types in a set of input data.

DETAILED DESCRIPTION OF THE PREFERRED EMBODIMENT

Figure 1:
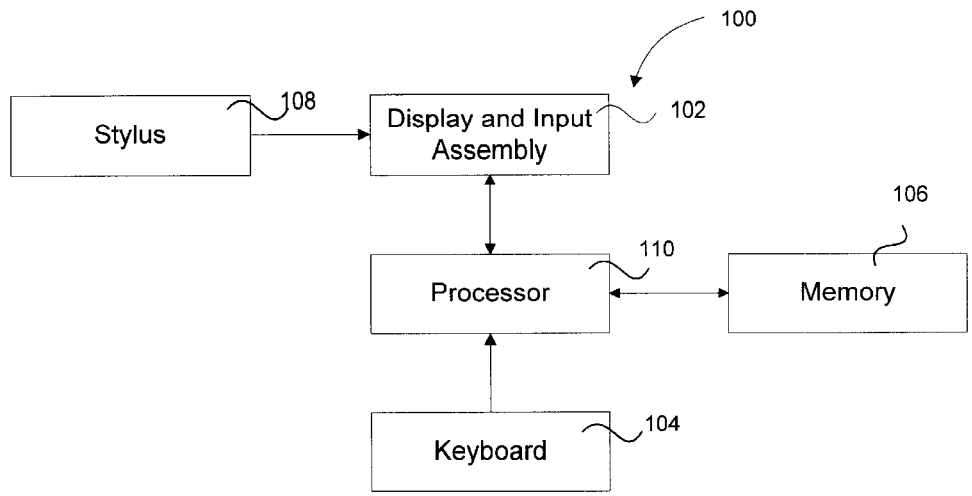
FIG. 1 is a prior art block diagram of a computing device.

An organize application embodying the invention is described as an application residing on a handheld computing device such as a palmtop personal computer (PC). FIG. 1 is a block diagram of major components of a typical pen-based handheld PC 100. The handheld PC 100 comprises a display and input assembly 102, a keyboard 104, a memory 106, a pen or stylus 108 and a processor 110. An operating system (OS) which manages the operations within the handheld PC 100 resides in the memory 106. The display and input assembly 102 is both an input and an output device. When acting as an output device, the assembly receives data from the processor 110 and displays that data on a suitable display screen. The display screen is preferably a liquid crystal display (LCD). The input device of the display assembly 102 is preferably a thin, clear membrane which covers the LCD display and which is sensitive to the position of the stylus 108 on its surface. With such a structure, the membrane of the display assembly 102 can serve as an input tablet.

The organize application is implemented as a series of program instructions that resides in a program storage device, such as the memory 106 of the handheld PC 100. The instructions are collectively known as an application program or simply a program. An organize application icon appears on the display assembly 102 to provide a means for launching the organize application. To launch the application, a user activates the organize application icon with the stylus 10. This action causes a control circuit of the display assembly 102 to send a launch organize application signal to the processor 110. The processor 110 on detecting the signal causes the OS to run the organize application program.

Figure 2:
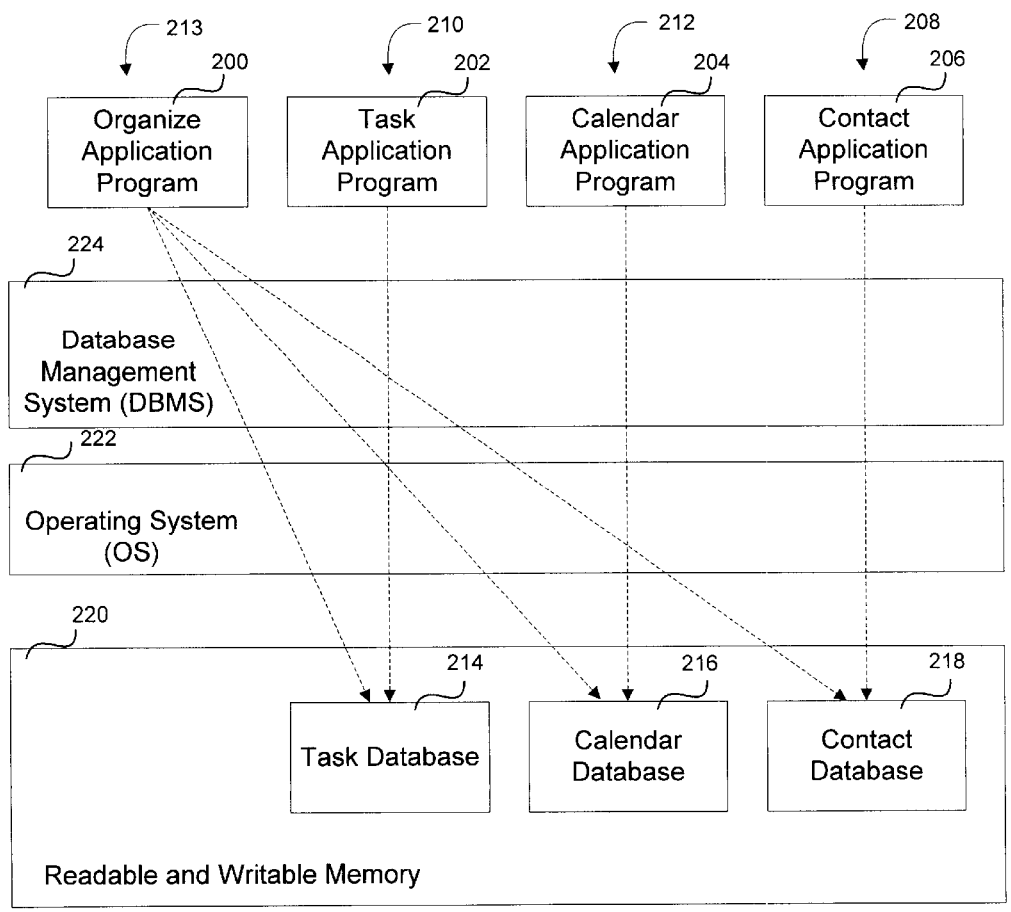
FIG. 2 is a block diagram of software residing in a memory of the computing devices in FIG. 1. One of the software is an organization application software which uses the data organization method in accordance with the present invention.

FIG. 2 is a block diagram showing software that usually resides in the memory 106 shown in FIG. 1. The memory 106 besides containing the organize application program 200 also contains other programs 202, 204 and 206, which provide other applications 208, 210 and 212 which are separate from the organize application 213. Examples of such existing applications on a handheld PC 100 are a contact application 208, a task application 210 and a calendar application 212. The user runs the contact application 208 to store and search for personal information such as names, addresses and telephone numbers of friends and business contacts. The task application 210 is run to maintain a list of outstanding to-dos. The task application 210 holds information such as task description, due date and others. The user runs the calendar application 212 to maintain a list of appointments, each of which logs information such as appointment description, date, time and venue.

The applications 208, 210 and 212 maintain their respective information in data stores such as files (not shown) or databases 214, 216 and 218 that reside in a readable and writable portion 220 of the memory 106. Each related group of data, for example, a name, an address and a telephone number, is stored in the task database 214 as a record. The individual pieces of information in the record, that is, the name, address and telephone number are known as fields. A database contains many instances of each record type. It is important to distinguish between a type and an instance of both a record and a field. For example, an instance of a contact record type in the contact database 218 consists of an instance of each of the following field types: name, address, telephone number and email address. As a further example, the name "John Smith" is an instance of the name field type. It is a common practice to drop the qualifiers "type" and "instance" (for both records and fields), and to rely on context to indicate which of the two is meant. The description that follows will adopt this common practice.

To access the databases 214, 216 and 218, the applications 210, 212, 213 and 214 use services provided by a separate layer of software commonly known as a database management system (DBMS) 224. The DBMS 224 in turn uses services provided by an OS 222 to read and write to the databases 214, 216 and 218. The DBMS 224 offers facilities such as facilities for creating databases, inserting data to and retrieving data from the databases 214, 216 and 218 and other facilities as is known to those skilled in the art.

The operation sequence of the organize application 213 embodying the invention is now explained with reference to FIG. 3. The organize sequence starts in a START step 300 where the OS 222 preserves a pre-application launch screen before it launches the organize application 213. The sequence then proceeds to a DISPLAY INPUT SCREEN step 302. In this step 302, the application displays a GUI data input screen on the display assembly 102 of the handheld PC 100. FIG. 4 is an example of an input screen 400 with an example of a set of input data 402 which a user can organize using the organize application. The input screen 400 consists of a data input portion 406 and two function indicia, an organize button 408 and a cancel button 410. The organize sequence next proceeds to an ACCEPT INPUT step 304, in which the application allows the user to input data using the keyboard 104. The application stores the input data 402 in an input buffer in the memory 106 and displays the data 402 on the data input portion 406 of the input screen 400. When the user completes the input data 402 entry, the user activates either the organize button 408 or cancel button 410, for example with the stylus 108. This selection of buttons may be carried out at a time convenient to the user. The input data, once captured in the ACCEPT INPUT step 304, will not be lost but remain in the input buffer. The buttons should not be construed as the only means for activating or canceling the organize function. Other well-known means such as a key depression or a voice command may also be used. When the user activates either of the buttons 408 or 410, the sequence proceeds to an ORGANIZE OR CANCEL? step 306 where the application 213 checks which of the two buttons 408 and 410 the user has activated. If the cancel button 410 has been selected, the application 213 terminates in an END step 308 where the OS 222 restores the pre-application launch screen on the display assembly 102. If the organize button 408 has been selected as determined in the ORGANIZE OR CANCEL? step 306, the sequence proceeds to an ORGANIZE DATA step 310, where the application 213 determines the type of the input data 402 and stores the data 402 into one or more of the databases 214, 216 and 218 befitting the type of the data 402. In this ORGANIZE DATA step 306, the application parses the input data to break the input data up into respective fields of one or more record types. This step will be described in more detail later.

Figure 4:
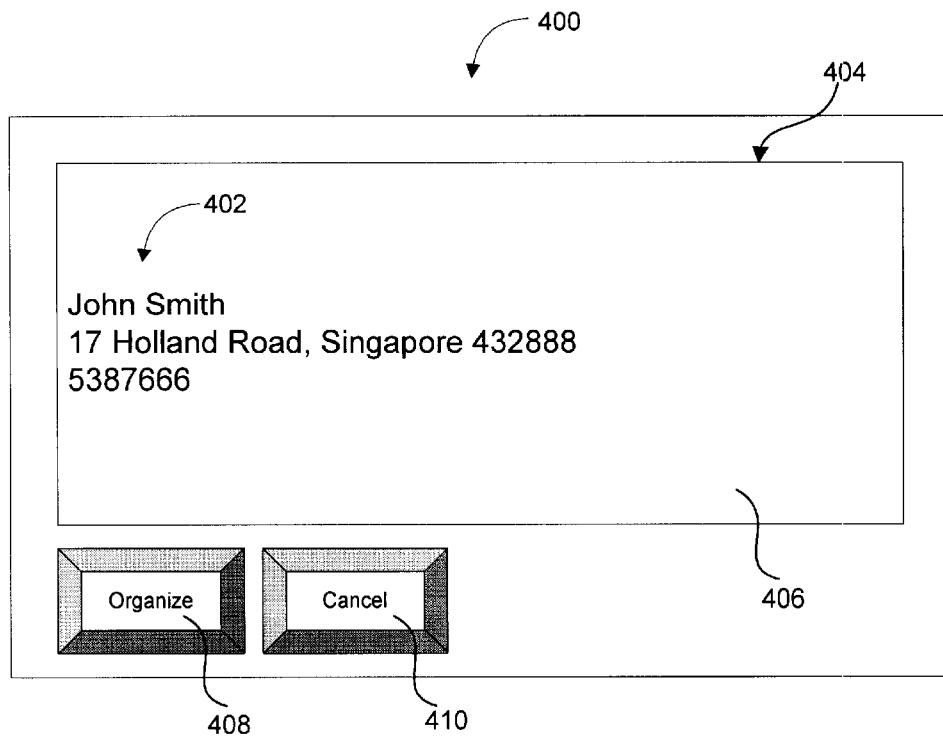
FIG. 4 is an example of a GUI data input screen used in the organization application of FIG. 2 which allows a user to input information for organization by the organize application.
Figure 5:
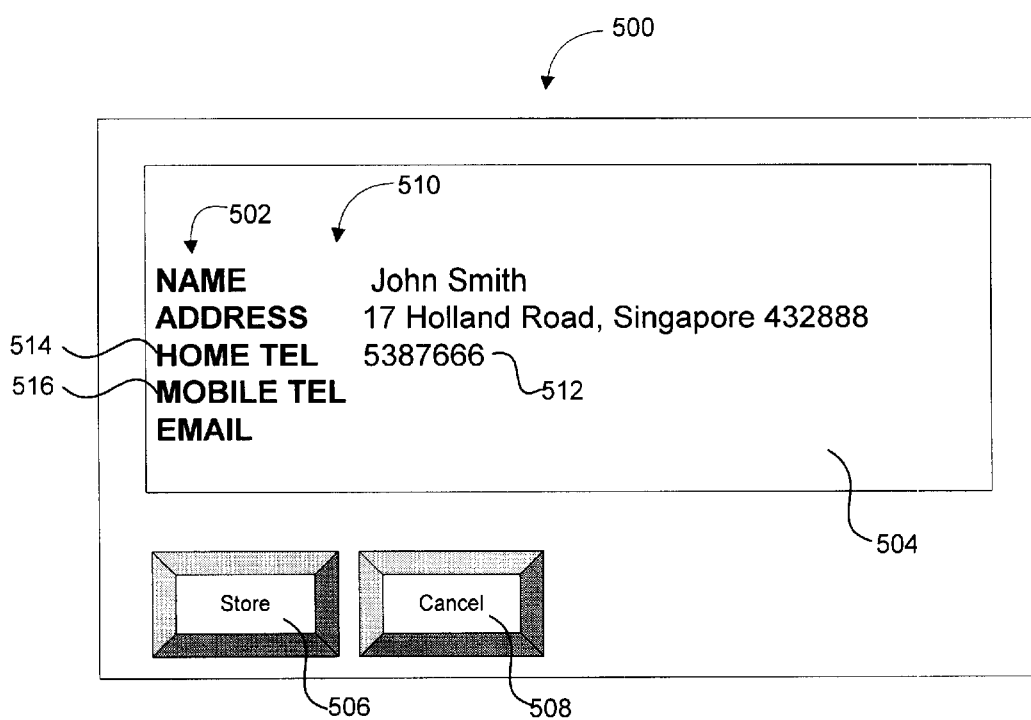
FIG. 5 is an example of a GUI confirmation screen used in the organize application of FIG. 2 which allows the user to confirm the organization of input information by the organize application.

The sequence next proceeds to a RECOGNIZED DATA? step 312. If the application is unable to recognize any record in the input data 402 or the fields present in a recognized record is insufficient to render the record meaningful, as determined in the RECOGNIZED DATA? step 312, the sequence returns to the ACCEPT INPUT step 304 and prompts the user that there is insufficient data to define any meaningful record. A record is considered meaningful if it contains a minimal set of fields. For example, the application requires that an entry to the contact data store 218 to contain at least a name and a telephone field or at least a name and an address field. If there is at least one single recognizable and meaningful record, the sequence will proceed to a DISPLAY CONFIRMATION SCREEN step 314 where the application 213 displays a confirmation screen on the display assembly 102. FIG. 5 is an example of a confirmation screen 500 in which the processed input data 402 in FIG. 4 is classified into the appropriate fields of a contact record type 502. The confirmation screen 500 includes an information display area 504, a store button 506 and a cancel button 508. The confirmation screen 500 is for the user to verify the information 510 that the application has classified and made ready for storage. The application 213 allows the user to modify the information 510 or to rearrange the information 510 according to what the user deems fit for storage into a database in an ACCEPT CONFIRMATION step 316. For example, if a single telephone number 512 is present in the input data 402, the application may categorize the number 512 to be a telephone number 514 whereas the user when entering the data 402 had intended the number 512 to be a mobile telephone number 516. The user in modifying the presented confirmation information 510 then moves the number 512 from the telephone field 514 to the mobile telephone field 516. When the user is finished with the modification, the user selects either the store button 506 or the cancel button 508. This action causes the sequence to proceed to a STORE OR CANCEL? step 318. If the cancel button 508 is selected, the sequence terminates in the END step 308 with the display of the pre-application launch screen. If the store button 506 is selected as determined in the STORE OR CANCEL? step 318, the sequence proceeds to a STORE TO DATABASE step 320. In this step 320, the application 213 opens an appropriate database for writing. How the application determines which database to open will be described later. In the example of FIGS. 4 and 5, the application opens the contact database 218 using an open database application programming interface (API) call provided by the DBMS 224. The application subsequently makes a separate write to database API call to write the modified contact record to the contact database 218. The application next checks in a LAST RECORD? step 322 to see if there are more records in the input data to be processed. If there are more records to be stored, the sequence returns to the DISPLAY CONFIRMATION SCREEN step 314, where a next record to be stored is displayed on the confirmation screen 500. If there are no more records to be stored as determined in the LAST RECORD? step 322, the sequence ends in the END step 308 where the OS 222 closes the application 213 and restores the pre-application launch screen on the display assembly 102. With the contact record 510 stored in the contact database 218, the user can now access the stored contact record 510 using the contact application 208.

Figure 3:
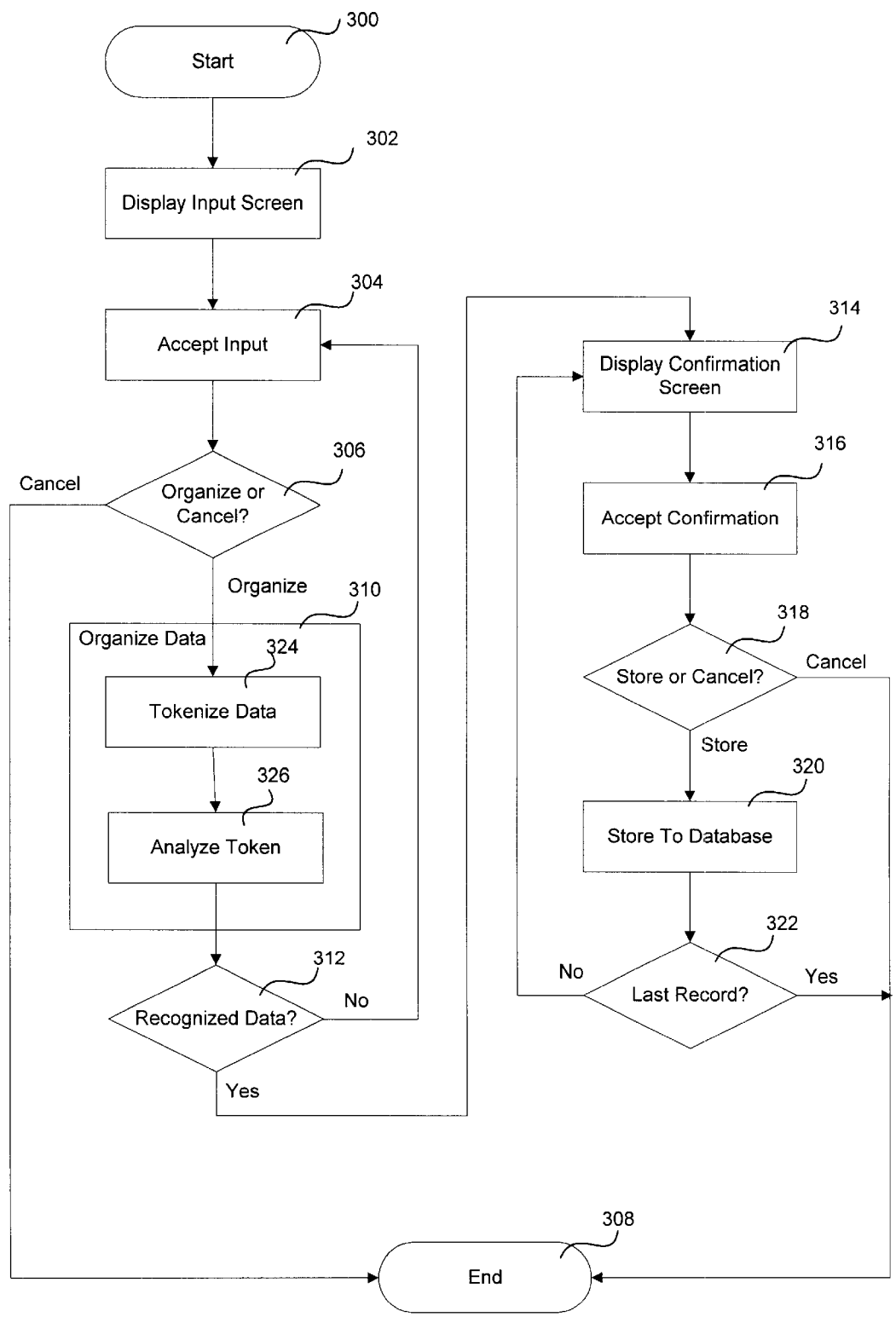
FIG. 3 is a flowchart illustrating the sequence of operation method of data organization in the organize application of FIG. 2.

All the above steps in FIG. 3 except the ORGANIZE DATA step 310 are self-explanatory to those skilled in the art of software programming. Reference is again made to FIG. 3 to describe in more detail the ORGANIZE DATA step 310. The ORGANIZE DATA step 310 is further divided into two sub-steps, a TOKENIZE DATA step 324 and an ANALYZE TOKEN step 326. FIG. 6 is another example of an input data 600 which a user can organize using the organize application program 200. This input data 600 is now used to aid in the explanation of the ORGANIZE DATA step 310.

In the TOKENIZE DATA step 324, the application separates the input characters into groups that logically belong together. These groups are assigned a token each. For the sake of illustration to aid understanding, the embodiment is described in terms of a simplified set of tokens which is sufficient for the application 213 to process the input data example 600 in FIG. 6. The simplified set of tokens is as follows:

| | |
|---|---|
| Text | string of characters |
| Number | string consisting of six or less numerals |
| Telephone | string consisting of more than six numerals |
| Time | string of numerals separated by either "." or ":" |
| Date | string of numerals separated by "/" |

It should be noted that tokens are not limited to those listed above. A developer implementing this application may decide the types of tokens that are required and the constituents of each of these tokens. The purpose of the tokens is to assist in the classifying of the input data into record fields. The more tokens there are the more complicated the TOKENIZE DATA step 324 will be as the application will be required to do more type comparisons when it assigns tokens. However, with more token types, the closer it will be for the application to achieve true free form data entry. Also with a larger number of tokens, the easier it will be for the application to identify a record field.

The tokenizing of the first line 602 of the input data 600 in FIG. 6 is now described. The application 213 in the TOKENIZE DATA step 324 reads in the first line "John Smith" from the input buffer and processes the line 602 character by character. The application recognizes the first line as consisting of two words "John" and "Smith" with a space character separating the two words. The application reads in each character from the start of the first line 602 until the space character is reached. Upon reaching the space character, the application categorizes the word preceding the space character, "John", as a TEXT token 604. Similarly the application in the TOKENIZE DATA step 324 recognizes that the word, "Smith", is another TEXT token 606 terminated with a second delimiter, a newline character. On processing a second line of data 608, the application using the same method as described above categorizes the numeric string "17" as a NUMBER token 610, the word "Holland" as a third TEXT token 612 and so on until the end of the line 608 is reached. FIG. 6 shows the tokens 614, 616 and 618 assigned to the rest of the second line of data. In processing a third line of data 620, the application recognizes that the numeric string, "5387666", not just as a number but as a telephone number since it contains more than six numerals. The application therefore categorizes the numeric string, "5387666", as a TELEPHONE token 619. The application in reading a fourth line of data 622 finds the line to be empty and recognizes the line to be a record separator. This separator indicates to the application that the preceding lines of data 602, 608 and 620 belong to a record 624 and other lines, if any, appearing after this separator 622 constitutes one or more new records.

The application is unable to ascertain the particular record type at this point of the processing of the sequence. The tokenizing of the next two lines 626 and 628 in the TOKENIZE DATA step 324 is straightforward. The application uses the same method described above to categorize the groups of characters in the lines 626 and 628 to be the TEXT and NUMBER tokens as shown in FIG. 6. The application categorizes the next two lines 630 and 632 to be DATE and TIME tokens respectively. Similarly, the application on detecting a following empty line 634 regards the preceding lines 626, 628, 630 and 632 as a second record 636.

The third record 638 is similarly categorized as tokens and recognized as a record 638 by the application.

The application next proceeds to the ANALYSE TOKEN step 326, where the application determines the field type of each line of data and record type of the three identified records 624, 636 and 638. This is not as straightforward as the preceding TOKENIZE DATA step 324 as this step 326 involves backtracking if during a first pass, the application is unable to determine the field type due to ambiguity. FIG. 7 is a set of rules used by the application to determine field and record types in a set of input data. In the first pass of the ANALYZE TOKEN step 326, the application is unable to determine the field type of the two TEXT tokens 604 and 606 of the first line 602 as the record type of the block of data 624 has yet to be determined. At this stage, a line consisting of simply TEXT tokens is ambiguous and may be one of a Name 702, Appointment Description 704 or Task Description 706 of the contact 208, calendar 212 or task 210 applications respectively. In continuing to process the second line of data 608, the application finds that the line 608 consists of the NUMBER token 606 and a series of TEXT tokens 612, 614 and 616 terminated with a second NUMBER token 618. The application is again unable to determine the record type of the group of information 624 and this second line of data 608 can well be an Address 708 or a Venue 710 field type of the contact 208 and calendar 212 application respectively. The application goes on to process the third line 620 and in the process, recognizes the line 620 as consisting of a single TELEPHONE token 619 and categorizes it as a telephone number field. With knowledge that one of the three lines 602, 608 and 620 is a telephone number, the application is able to categorize the group of three lines 602, 608 and 620 as a Contact record type. With knowledge of the record type, the application is able to revisit the first two lines 602 and 608 to categorize them as Name and Address fields of a contact record using rules 702 and 708 given in FIG. 7.

Similarly, the application using the method described above is able to classify the remaining two records as Calendar and Task records. An application recognizes an appointment record type by the presence of a TIME token unique to the appointment record type. A task record type is recognized as one with only a DATE information and no time information.

The above description of the preferred embodiment of this invention is intended to be illustrative and not limiting. Other embodiments of this invention will be obvious to those skilled in the art in view of the above disclosure.

For example, in the above disclosure, the keyboard 104 is described as a means to enter data for organization. It will be expressly understood by those skilled in the art that a handwriting recognition or voice recognition means is equally applicable. In fact with the latter data entry means, it is possible that input data can be more quickly captured. Also, instead of organizing all of the input data, a subset may be selected using a method such as highlighting and having the organize application process only the selected subset of the input data. The method can be further enhanced by having a user indicate to the organize application a data store to which the selected subset of the input data should be stored. This indication could be in the form of selecting a separate application icon to initiate the organize function to process the subset of input data.

As a further example, the organize application need not be separate and independent of the other applications but integrally implemented with the applications. The implementation may be in the form of a software function within the applications. This will allow a user to capture and organize other types of information when using any one of the applications. For example, when using a calendar application, a user may invoke an organize function within the calendar application to capture and organize contact information. It is also not preposterous to have such an organize function in a word processing application like Microsoft Word available from Microsoft Corporation (Redmond, Wash., USA). A user of such an application may do a lot of word processing on information like names and addresses and will certainly welcome a feature allowing the user to capture the information in a contact database.

As yet a further example, the DBMS 224 may be replaced by a simple set of file manipulation routines and databases 214, 216 and 218 may be implemented as other data stores such as simple files in line with the file manipulation routines.

Also, for the sake of illustration, the above disclosure is described in terms of personal management information. However the invention should not be construed to be limited to only being able to organize personal management information. A user will be able to adapt the invention to a different application, for example, an application involving a car parts database where information regarding suppliers, parts and stock availability are maintained.

The tokens and token composition rules given in the above disclosure are meant only for illustration purposes. The disclosed tokens and rules in FIG. 7 are chosen for only a simple application to aid the understanding of the ORGANIZE DATA step 310 and may not suffice for a full-fledged commercial application. Though the disclosed embodiment works, it suffers from some limitations. One example of a limitation is the ambiguity when trying to identify record fields from the tokens. The embodiment can easily be enhanced to reduce or eliminate ambiguity. One way to reduce ambiguity is to have a dictionary which contains words pertaining to addresses, for example, "road", "street", "drive", etc., to help in identifying such fields. With the reduction of ambiguity, the limitation of having fields of a record as a separate block may be eliminated. This dictionary is extendable to include new words relating to addresses. For example, if the word "boulevard" is not already found in the dictionary, a user is able to add the word to the dictionary. Alternatively, the application may be implemented with a feature which prompts the user if unrecognized words in an address field should be added to the dictionary. If ambiguity can be removed altogether with a complete dictionary, fields of a record may be interspersed with fields of other records. The organize application will be able to identify the fields as belonging to a record even though the fields are scattered in the input data. Also, in the disclosed embodiment, each data store is described as containing a single type of record and this should not be construed as a limitation.

However having discussed some of the limitations of the disclosure, it will be relatively easy for a developer skilled in the art to quickly understand the concept of the invention and be able to modify and extent it to build a more commercially viable product which embodies some of the features discussed.

We claim:

1. A method for organizing input data into appropriate fields of a record in a data store of a computing device with a display, the method comprising the steps of:

receiving free form input data for organization;

identifying in the input data a logical group of data belonging to the record, including separating characters in the input data into tokenizable logical sub-groups to which tokens are assigned, using the tokens to identify the logical group of data in the input data, using the tokens to also identify a record in the data store to which the logical group of data can be stored, wherein the steps of using the tokens to identify the logical group of data in the input data and using the tokens to also identify a record in the data store to further include identifying tokens as belonging to a unique field of a record leaving ambiguous tokens unclassified, and separating the tokenized logical sub-groups into the appropriate fields of the record; and storing the logical group of data into the appropriate fields of the record in the data store.

2. A method for organizing input data into appropriate fields of a record in one of a plurality of data stores containing different types of records in a computing device, the method comprising the steps of:

receiving free form input data for organization;

identifying in the input data a logical group of data belonging to a record of a data store in the plurality of data stores, including
    separating characters in the input data into tokenizable logical sub-groups to which tokens are assigned,
    using the tokens to identify the logical group of data in the input data,
    using the tokens to also identify a record in one of the plurality of data stores to which the logical group of data can be stored,
        wherein the steps of using the tokens to identify the logical group of data in the input data and using the tokens to also identify a record in one of the plurality of data stores further include identifying tokens as belonging to a unique field of a record leaving ambiguous tokens unclassified, and
    separating the tokenized logical sub-groups into fields of the record in the one of the plurality of data stores; and
storing the logical group of data into the appropriate fields in the record of the data store.

3. A method for organizing input data into appropriate fields of a record in one of a plurality of data stores containing different types of records in a computing device, the method comprising the steps of:

receiving free form input data for organization;

identifying in the input data a logical group of data belonging to a record of a data store in the plurality of data stores, including
    separating characters in the input data into tokenizable logical sub-groups to which tokens are assigned,
    using the tokens to identify the logical group of data in the input data,
    using the tokens to also identify a record in one of the plurality of data stores from the unique field,
        wherein the steps of using the tokens to identify the logical group of data in the input data and using the tokens to also identify a record in one of the plurality of data stores further include the steps of:
            identifying tokens as belonging to a unique field of a record leaving ambiguous tokens unclassified,
            identifying the record in one of the plurality of data stores from the unique field and
            processing the unclassified tokens to classify them as belonging to other fields of the record, and
    separating the tokenized logical sub-groups into fields of the record in the one of the plurality of data stores; and
storing the logical group of data into the appropriate fields in the record of the data store.

* * * * *

UNITED STATES PATENT AND TRADEMARK OFFICE
CERTIFICATE OF CORRECTION

PATENT NO. : 6,741,994 B1
DATED : May 25, 2004
INVENTOR(S) : Jin Fye Leong and Beng Hong Alex Kang It is certified that error appears in the above-identified patent and that said Letters Patent is hereby corrected as shown below:

<u>Title page,</u>
Item [54], Title, "METHOD AND AUTOMATIC ORGANIZATION OF DATA" should read -- METHOD FOR AUTOMATIC ORGANIZATION OF DATA --.

Signed and Sealed this

Thirty-first Day of August, 2004

JON W. DUDAS
*Director of the United States Patent and Trademark Office*